(12) United States Patent
Davidson et al.

(10) Patent No.: US 7,155,505 B1
(45) Date of Patent: Dec. 26, 2006

(54) METHODS AND SYSTEMS FOR TICKET VOUCHER FLOW CONTROL IN RESPONSE TO SIGNALING LINK FAILURE

(75) Inventors: Mark Ernest Davidson, Chapel Hill, NC (US); David Michael Sprague, Raleigh, NC (US); Mark Edward Kanode, Apex, NC (US)

(73) Assignee: Tekelec, Morrisville, NC (US)

( * ) Notice: Subject to any disclaimer, the term of this patent is extended or adjusted under 35 U.S.C. 154(b) by 657 days.

(21) Appl. No.: 09/633,970

(22) Filed: Aug. 8, 2000

(51) Int. Cl.
*G06F 15/173* (2006.01)
(52) U.S. Cl. ................................ 709/224; 379/221.03
(58) Field of Classification Search ................ 379/229, 379/230, 221, 221.1, 221.03, 221.09, 221.12, 379/315, 273, 258, 221.01, 219; 709/223–225, 709/238, 239, 250, 242, 244, 227, 228
See application file for complete search history.

(56) References Cited

U.S. PATENT DOCUMENTS

| | | | | |
|---|---|---|---|---|
| 5,084,816 A | * | 1/1992 | Boese et al. ................... | 714/4 |
| 5,165,019 A | * | 11/1992 | Sweazey ..................... | 709/251 |
| 5,485,578 A | * | 1/1996 | Sweazey ..................... | 709/224 |
| 5,550,914 A | * | 8/1996 | Clarke et al. ................ | 379/230 |
| 5,692,030 A | | 11/1997 | Teglovic et al. | |
| 6,111,854 A | | 8/2000 | Mukaino | |
| 6,125,111 A | | 9/2000 | Snow et al. | |
| 6,134,217 A | | 10/2000 | Stiliadis et al. | |
| 6,172,963 B1 | | 1/2001 | Larsson et al. | |
| 6,327,267 B1 | * | 12/2001 | Valentine et al. ........... | 370/466 |
| 6,327,270 B1 | * | 12/2001 | Christie et al. ............. | 370/469 |
| 6,333,931 B1 | * | 12/2001 | LaPier et al. ................ | 370/385 |
| 6,504,923 B1 | * | 1/2003 | Swale ..................... | 379/221.09 |
| 6,584,190 B1 | * | 6/2003 | Bressler ....................... | 379/230 |
| 6,718,139 B1 | * | 4/2004 | Finan et al. .................. | 398/59 |

FOREIGN PATENT DOCUMENTS

EP  0 939 560  9/1999

OTHER PUBLICATIONS

Configurable Flow Control Mechanism for Fault-tolerant Routing, May 1995, ACM SIGARCH Computer Architecture News, vol. 23 Issue 2, ACM publication.*
Totally ordered gigabit multicasting, By X Chen, L E. Moser, and P M Melliar-Smith, published by The institution of Electrical Engineers and IOP Publishing Ltd., 1997, Received on May 15, 1996.*

* cited by examiner

*Primary Examiner*—John Follansbee
*Assistant Examiner*—Mohammad Siddiqi
(74) *Attorney, Agent, or Firm*—Jenkins, Wilson, Taylor, & Hunt, P.A.

(57) ABSTRACT

Methods and systems for ticket voucher flow control throttle MSUs that were enqueued during a signaling link failure. The throttling is performed based on a system of ticket voucher requests and grants. Communication modules seeking to send call signaling messages to outgoing signaling links issue ticket voucher requests. Grantors that are available to send the call signaling messages issue grants to the requestor. The grants may be based on the available capacity of an outbound signaling link.

36 Claims, 8 Drawing Sheets

METHODS AND SYSTEMS FOR TICKET VOUCHER FLOW CONTROL IN RESPONSE TO SIGNALING LINK FAILURE

TECHNICAL FIELD

The present invention relates to methods and systems for message flow control in response to signaling link failure. More particularly, the present invention relates to methods and systems for ticket voucher flow control in response to signaling link failure.

BACKGROUND ART

In a common channel signaling network, such as an SS7 network, call signaling messages are used to set up and tear down calls between end users and to communicate with databases. These call signaling messages are sent over signaling links to a signaling node that routes the call signaling messages to the appropriate destination. The signaling links can be SS7 signaling links, IP signaling links, or other signaling links suitable for carrying call signaling messages. The node that conventionally handles such signaling links is referred to as a single transfer point or a signaling gateway.

One problem with conventional signal transfer points or signaling gateways occurs when one of the signaling links fails. When a signaling link fails, messages directed to that link are buffered. The signal transfer point or signaling gateway determines an alternate route to the destination and sends the buffered messages over an alternate outgoing signaling link (if available) that has not failed. Because SS7 signaling links are typically underutilized, i.e., only about 40% of total capacity is typically used, the message transfer rate of the outgoing signaling links can be increased relative to the message transfer rate of the incoming signaling links until all of the messages that were buffered for the failed signaling link have been transmitted. Once the signaling gateway transmits all of the buffered messages, the capacity of the outgoing signaling link can be decreased back to its normal level.

The process described above for responding to a signaling link failure works well only when the incoming and outgoing signaling links are low speed signaling links, i.e., capable of processing no more than about 300 messages per second. If the incoming signaling link is a high speed signaling link, i.e., capable of processing 2000 or more messages per second, the buffer used to store messages when the outgoing signaling link fails can quickly be overrun. In addition, even if the buffer is not overrun, it may take a long period of time for the outbound signaling link to deplete the messages stored in the buffer when another signaling link fails. Thus, there exists a need for novel methods and systems for performing flow control between incoming and outgoing signaling links in a signaling point when one or more of the signaling links fails.

DISCLOSURE OF THE INVENTION

According to one aspect, the present invention includes methods and systems for flow control through a signaling node when a signaling link fails using ticket voucher messages. As used herein, ticket voucher messages are messages transmitted between inbound and outbound communication modules to throttle the flow of call signaling messages when a signaling link fails. Ticket voucher messages have conventionally been used between link interface modules and signaling connection control part (SCCP) cards to indicate whether the SCCP cards have the capacity to perform operations, such as global title translation, on incoming messages. The present invention includes novel methods and systems for using ticket voucher messages to throttle traffic between communication modules in a signaling node when one or more signaling links fail.

The present invention will be explained below in terms of modules or processes for performing ticket voucher flow control. It is understood that these modules or processes may be implemented in hardware, software, or a combination of hardware and software. Accordingly, some embodiments of the present invention may be implemented as computer program products comprising computer executable instructions embodied in a computer readable medium.

Accordingly, it is an object of the present invention to provide novel methods and systems for performing flow control between communication modules in a signaling node when one or more signaling links fail.

Some of the objects of the invention having been stated hereinabove, other objects will be evident as the description proceeds, when taken in connection with the accompanying drawings as best described hereinbelow.

BRIEF DESCRIPTION OF THE DRAWINGS

A description of the present invention will now proceed with reference to the accompanying drawings of which.

DETAILED DESCRIPTION OF THE INVENTION

Figure 1:
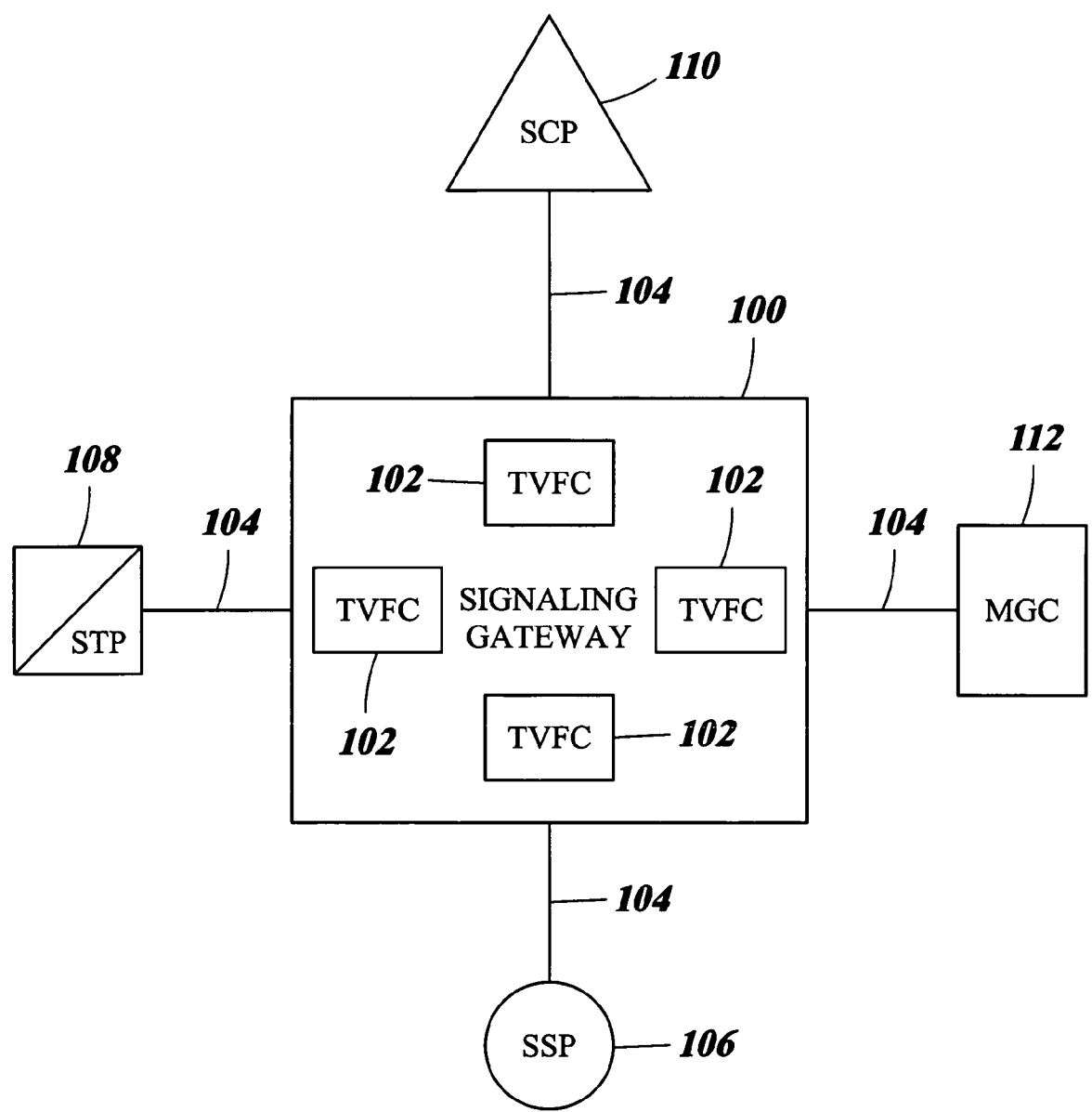
FIG. 1 is a block diagram of an exemplary operating environment for embodiments of the present invention.

FIG. 1 illustrates an exemplary operating environment for embodiments of the present invention. In FIG. 1, a signaling gateway 100 includes ticket voucher flow control processes 102 associated with signaling links 104 to regulate the flow of messages when one of the signaling links 104 fails. Signaling links 104 can be any type of signaling link used to communicate call signaling messages. For example, the signaling links can be SS7 signaling links, TCP/IP signaling links, or any other type of signaling links used to communicate call signaling messages. Signaling gateway 100 is preferably capable of receiving call signaling messages and routing the call signaling messages to the appropriate destination. In the illustrated embodiment, signaling gateway 100 is configured to communicate with a service switching point 106, a signal transfer point 108, a service control point 110, and a media gateway controller 112. However, the present invention is not limited to communicating with only these signaling nodes. The signaling nodes illustrated in FIG. 1 are shown for illustrative purposes only.

With the exception of ticket voucher flow control process 102, the internal architecture of signaling gateway 100 may be similar to that of the EAGLE® signal transfer point or the IP$^7$ SECURE GATEWAY™ available from Tekelec, Inc., of Calabasas, Calif. (hereinafter, "Tekelec"). A detailed description of the EAGLE® STP may be found in EAGLE® Feature Guide PN/910-1225-01, revision B, January 1998, published by Tekelec, the disclosure of which is incorporated herein by reference in its entirety. Similarly, a detailed description of the IP7 SECURE GATEWAY™ may be found in Tekelec publication PN/909-0767-01, revision B, August 1991, entitled "Feature Notice: IP7 SECURE GATEWAY™ Release 1," the disclosure of which is incorporated herein by reference in its entirety. The specific functions of the IP7 SECURE GATEWAY™ for transmitting and receiving TCAP messages over an Internet protocol network are described in PCT Publication No. WO 00/35155, the disclosure of which is incorporated herein by reference in its entirety. Similarly, the functional components of the IP7 SECURE GATEWAY™ for transmitting ISUP messages over an Internet protocol network are described in PCT Publication No. WO 00/35156, the disclosure of which is incorporated herein by reference in its entirety.

Figure 2:
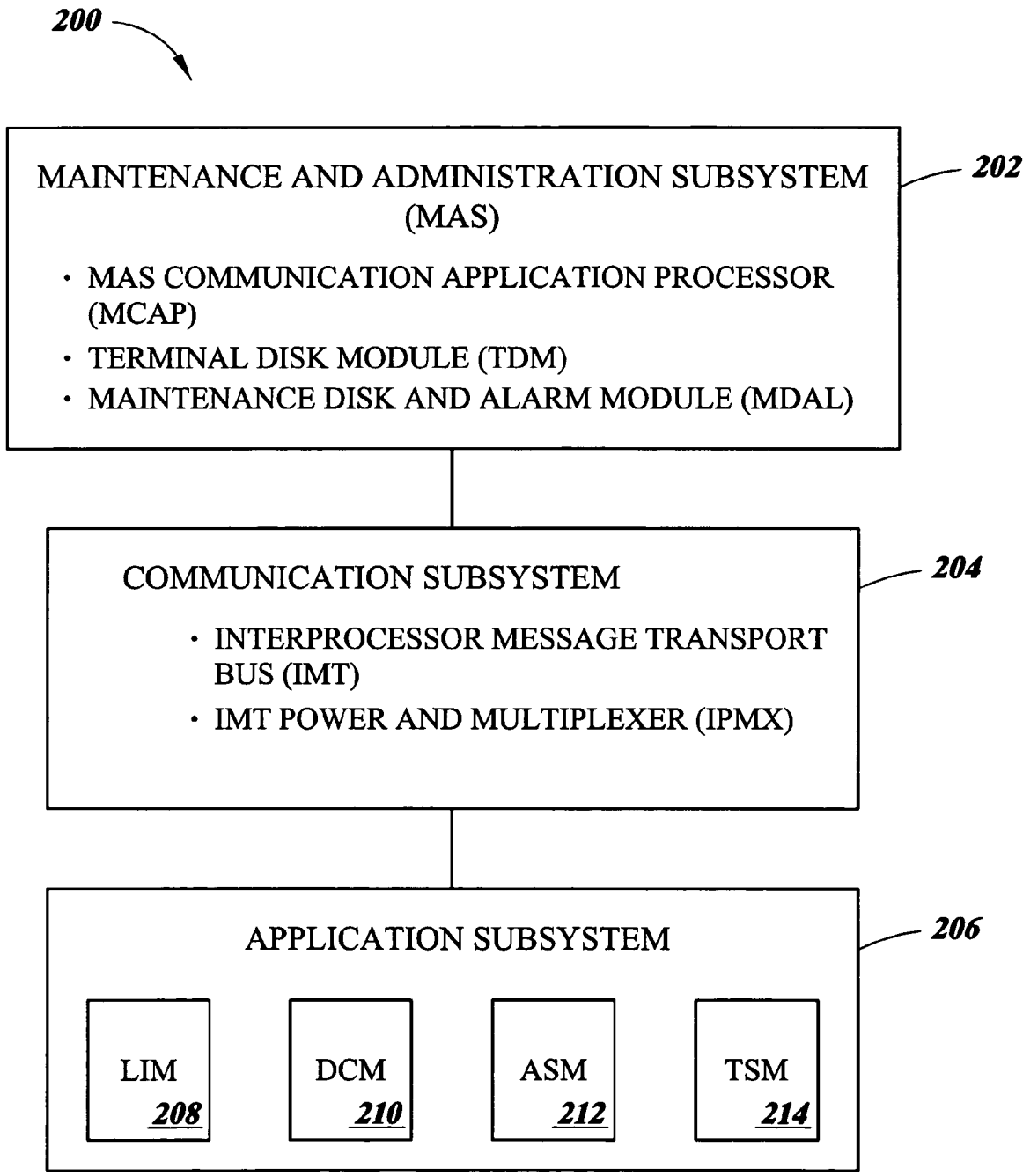
FIG. 2 is a block diagram of a conventional signaling gateway to which ticket voucher flow control methods of the present invention may be applied.

FIG. 2 illustrates the internal subsystems of an EAGLE® STP or an IP7 SECURE GATEWAY™ to which the methods for performing ticket voucher flow control according to the present invention may be applied. In the illustrated embodiment, STP or signaling gateway 200 includes the following subsystems: a maintenance and administration subsystem (MAS) 202, a communication subsystem 204, and an application subsystem 206. The maintenance and administration subsystem 202 provides maintenance communications, initial program loading, peripheral services, provisioning capability, alarm processing, and system disks. Communication subsystem 204 includes an interprocessor message transport (IMT) bus that is the main communication bus among all of the subsystems in signaling gateway 200. In a preferred embodiment, the interprocessor message transport bus includes two 125 Mbps counter-rotating serial buses.

Application subsystem 206 includes cards that are capable of communicating with other cards through the IMT bus. Numerous types of application cards can be incorporated in signaling gateway 200. Examples of such cards includes a link interface module (LIM) 208 that provides SS7 and X.25 links, a data communications module (DCM) 210 that provides SS7-to-TCP/IP and TCP/IP-to-SS7 translation, and an application service module (ASM) 212 that provides global title translation, gateway screening, and other services. A translation service module (TSM) 214 may also be provided to support local number portability service. While multiple application modules or cards may be simultaneously configured and operatively connected to the IMT bus, it will be appreciated that each card is assigned a unique IMT bus address so as to generally facilitate the internal communication of messages between provisioned cards that are attached to the IMT bus. Once again, a detailed description of the EAGLE® STP other than DCM 210 is provided in the above-cited EAGLE® Feature Guide and need not be described in detail herein. DCM 210 is described in detail in the above-referenced International Patent Publications.

With regard to communication type modules, DCM card 210 can be used to communicate IP-encapsulated SS7 messages over an IP network, as described in the above-referenced Feature Notice IP7 SECURE GATEWAY™ release 1.0 publication. With regard to the TSM module and triggered LNP services mentioned above, a detailed description of the triggered LNP functionality of an STP or a signaling gateway can be found in Feature Guide: LNPLSMS PN/910-158-01, revision A, January 1998, published by Tekelec, the disclosure of which is incorporated herein by reference in its entirety. Furthermore, systems and methods for providing triggerless LNP functionality within a network routing node are described in commonly-assigned, U.S. Pat. No. 6,639,981, the disclosure of which is incorporated herein by reference in its entirety.

Figure 3:
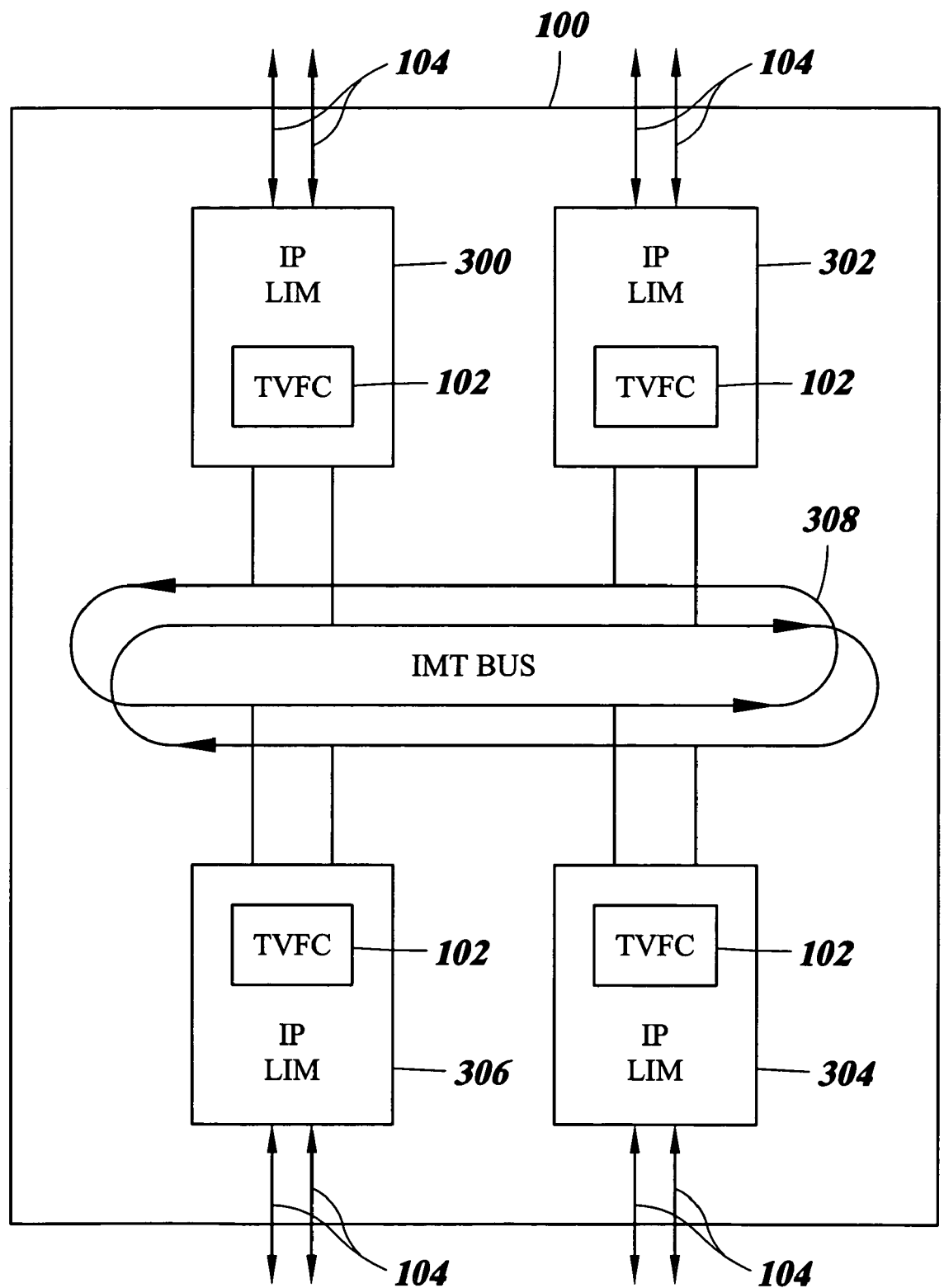
FIG. 3 is a block diagram illustrating the internal architecture of a signaling gateway including one or more ticket voucher flow control processes according to an embodiment of the present invention.

FIG. 3 is a block diagram of an exemplary internal structure of signaling gateway 100 according to an embodiment of the present invention. For convenience, only the interface modules that communicate with external call signaling links are illustrated. It is understood that signaling gateway 100 may include other modules, such as LIMs, DCMs, TSMs, ASMs, etc., as discussed above with respect to FIG. 2. In the illustrated embodiment, signaling gateway 100 includes Internet protocol link interface modules (IP LIMs) 300, 302, 304, and 306 for communicating with external nodes over signaling links 104. Although the IP LIMs can be configured to communicate with any number of external signaling links, in FIG. 3, each IP LIM manages two signaling links 104.

Each of the Internet protocol link interface modules 300, 302, 304, and 306 may be a separate card or printed circuit board with its own resident microprocessor and memory devices. Alternatively, IP LIMs 300, 302, 304, and 306 may be separate processes executing on the same microprocessor using a time sharing algorithm. In the illustrated embodiment, IP LIMs 300, 302, 304, and 306 are connected to each other by an interprocessor message transport bus 308. IMT bus 308 may be a dual-ring, counter-rotating bus for providing additional reliability in the event that one of the Internet protocol link interface modules fails. IMT bus 308 carries messages, such as call signaling messages, between Internet protocol link interface modules and any other modules included in signaling gateway 100. In addition, according to the present invention, IMT bus 308 carries ticket voucher request and grant messages between Internet protocol link interface modules 300, 302, 304, and 306. The generation and transfer of the ticket voucher grant and request messages will be discussed in more detail below.

Figure 4:
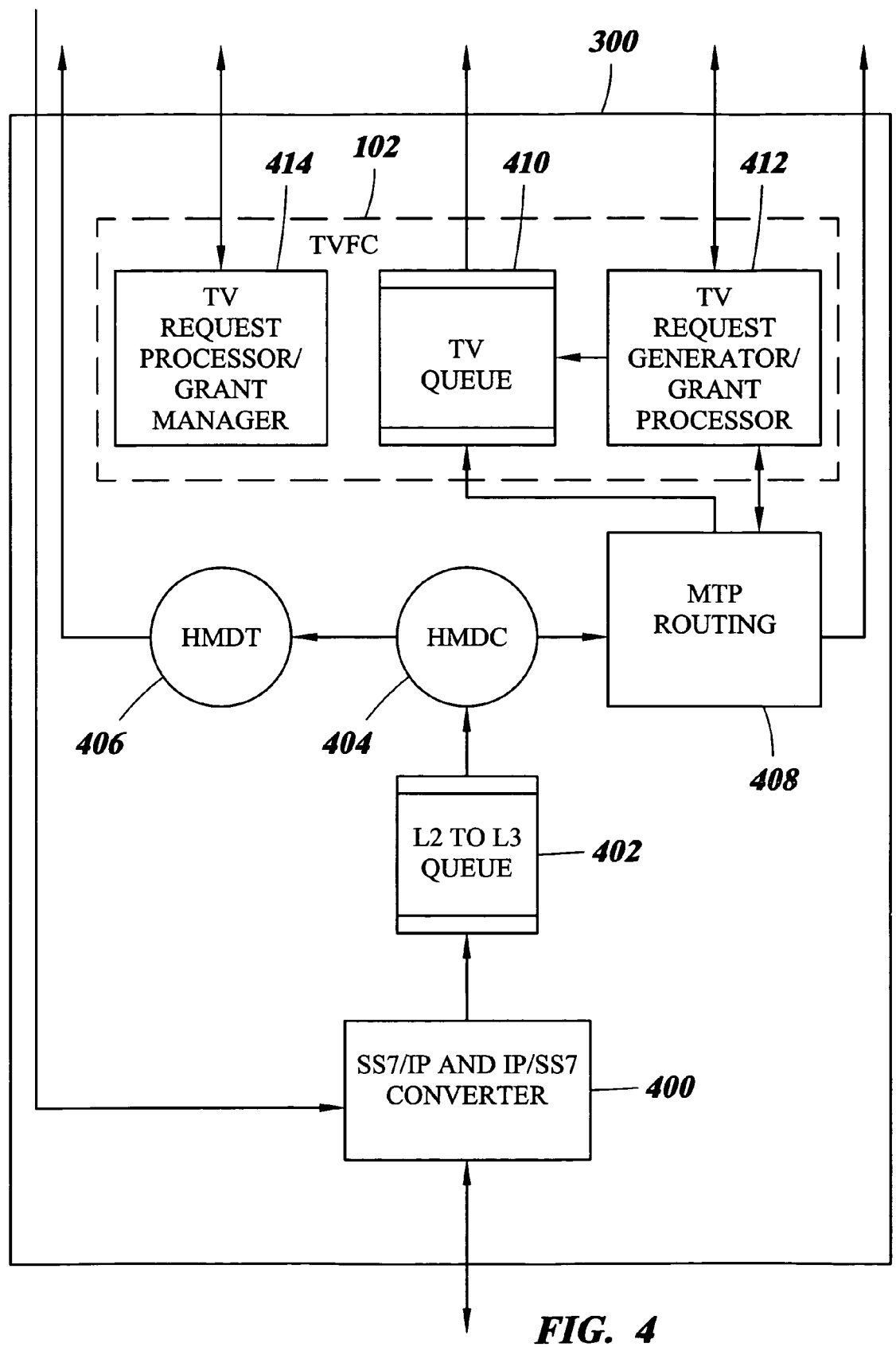
FIG. 4 is a block diagram of a link interface module including a ticket voucher flow control process according to an embodiment of the present invention.

FIG. 4 is a block diagram illustrating an Internet protocol link interface module according to an embodiment of the present invention in more detail. In FIG. 4, Internet protocol link interface module 300 includes a plurality of processes for handling incoming and outgoing messages as well as processes for performing ticket voucher flow control according to embodiments of the present invention. For example, Internet protocol link interface module 300 includes an SS7/IP and IP/SS7 converter 400 for converting messages between SS7 and IP and vice versa. L2 to L3 queue 402 stores SS7 messages between SS7 layer 2 and layer 3 processes. Message handling and discrimination (HMDC) process 404 determines whether an inbound SS7 message is directed to this signaling gateway or to another signaling node. This determination may be based on the MTP routing label in the SS7 message. If HMDC process 404 determines that the message is directed to this signaling node, HMDC process 404 routes the message to message handling and distribution (HMDT) process 406 to be routed to an internal card for further processing. An example of such a message that requires further processing is a message that requires global title translation. Such processing is not of importance to the present invention. Accordingly, in the remaining explanation, it is assumed an incoming message is routed to an external node.

Once HMDC process 404 determines that a message is to be routed to an external signaling node, HMDC process 404 forwards the message to MTP routing process 408. MTP routing process 408 examines signaling information in the message and determines the internal IMT bus address of the communications module that manages the outbound signaling link to which the message is addressed. According to the present embodiment, MTP process 408 also communicates with ticket voucher flow control process 102 to regulate message flow in the event of a link failure.

Figure 5:
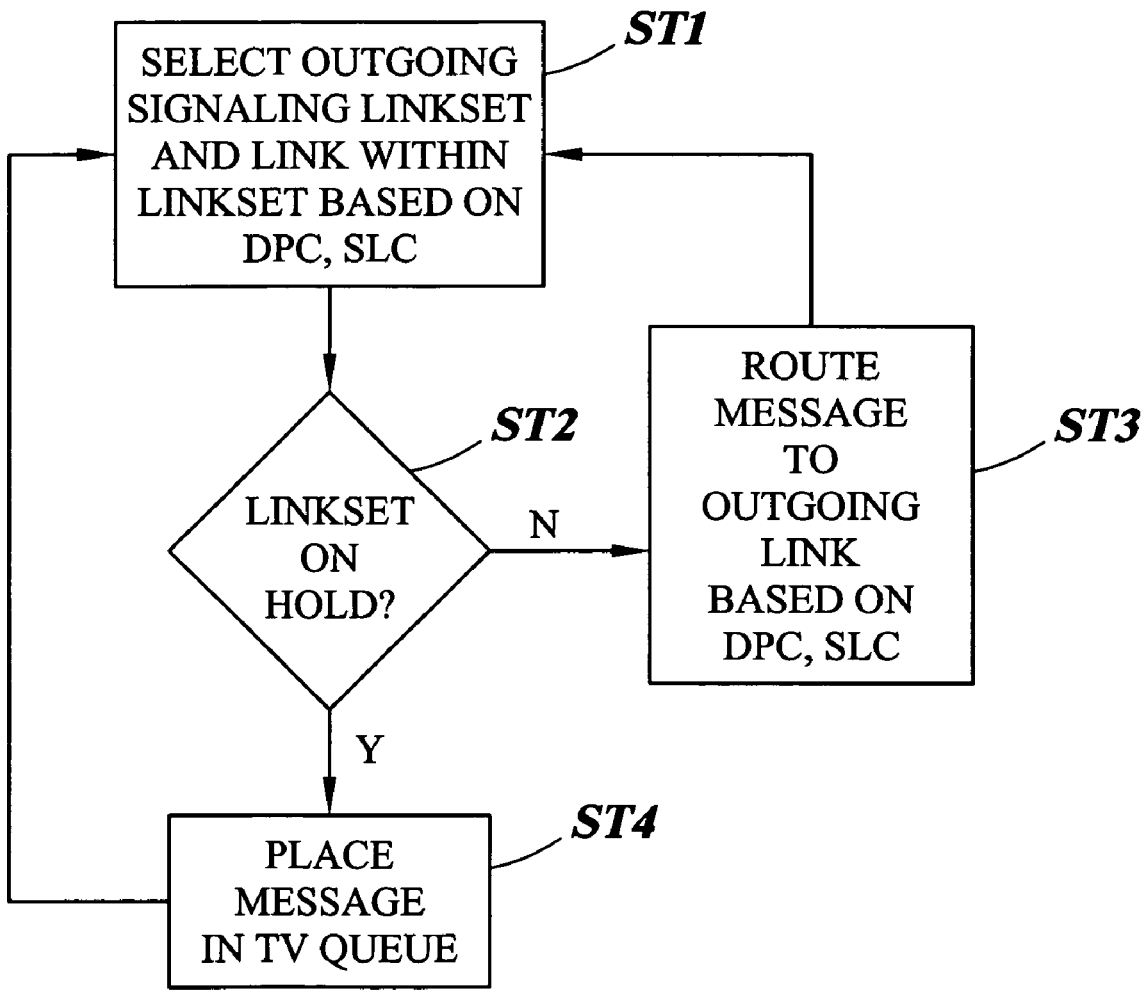
FIG. 5 is a flow chart illustrating exemplary steps that may be performed by an MTP routing process modified to operate with a ticket voucher flow control process according to an embodiment of the present invention.

FIG. 5 illustrates exemplary steps that may be performed by MTP routing process in regulating message flow based on ticket voucher grants according to an embodiment of the present invention. Referring to FIG. 5, in step ST1, MTP routing process 408 selects an outgoing signaling linkset and a link within the linkset based on the destination point code and signaling link selection code in a message. In SS7 communications, a link is a path to an adjacent node. Links are placed into groups, which are referred to as linksets. All links in a linkset are capable of accessing the same adjacent signaling node. In step ST2, MTP routing process 408 determines whether the outgoing signaling linkset is on hold. Determining whether a linkset is on hold can be accomplished by reading a flag in a routing table associated with the linkset. The flag may be set by SS7 traffic management processes when a link fails. The following is a sequence of events that may occur in a signaling gateway or a signal transfer point when a signaling link fails:

1. A link in a linkset becomes unavailable.
2. The communication module associated with the link notifies other modules that its link is unavailable.
3. The MTP routing functions associated with each communication module flag the linkset as on hold. MTP layer 3 functions associated with the communication module having the failed linkset send a changeover message to the adjacent node and start a sequence timer to prevent race conditions from occurring.
4. A message addressed to the on-hold linkset arrives at one of the communication modules and is enqueued because the linkset is on hold.
5. The linkset goes off-hold because a) the sequence timer expires, or b) a changeover acknowledgement message is received from an adjacent node.
6. Messages queued while linkset was on hold are now routed, using ticket voucher messages for pacing.

In step ST3, if MTP routing process determines that the linkset is not on hold, MTP routing process 408 simply routes the message to the outgoing link. However, in step ST4, if MTP routing process 408 determines that the linkset is on hold, MTP routing process 408 places the message in ticket voucher queue 410. Ticket voucher queue 410 stores the message until a ticket voucher request is granted for the message or until the message is dequeued by a background process adapted to send MSUs at a low-speed rate, such as 600 MSUs/sec, or until it becomes necessary to discard the message. The operation of ticket voucher queue 410 and the granting and requesting of ticket vouchers will be discussed in more detail below. Once MTP routing process places the message in the ticket voucher queue, control returns to step ST1 where the MTP routing process 408 processes the next message.

Figure 6:
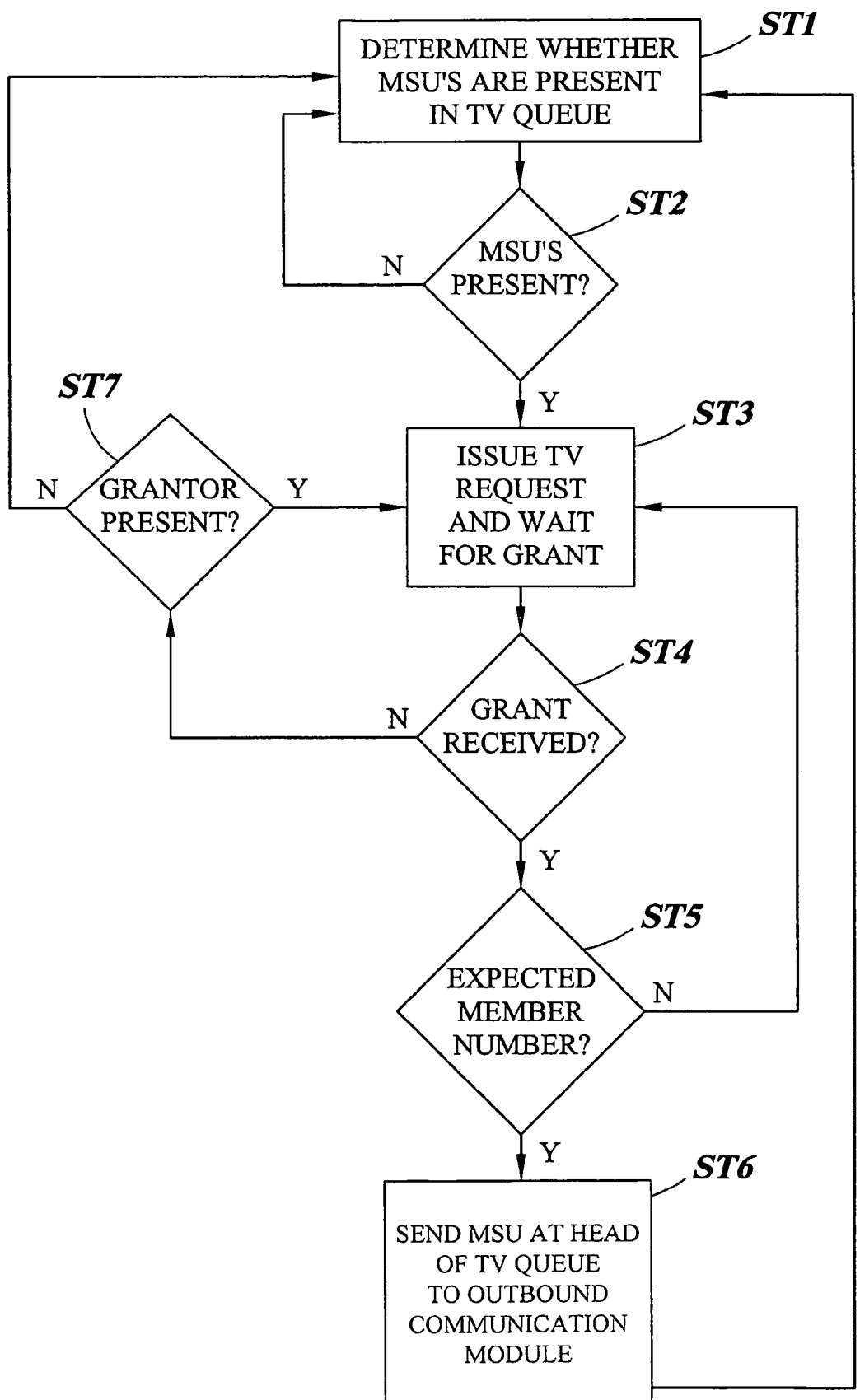
FIG. 6 is a flow chart illustrating exemplary steps that may be performed by a ticket voucher flow control process in issuing a ticket voucher request according to an embodiment of the present invention.

FIG. 6 illustrates exemplary steps that may be performed by ticket voucher request generator/grant processor 412 in formulating ticket voucher requests and processing ticket voucher grants according to an embodiment of the present invention. The steps illustrated in FIG. 6 assume that the linkset to which MSUs in the ticket voucher queue are addressed has gone off-hold. In step ST1, ticket voucher request generator/grant processor 412 determines whether MSUs are present in ticket voucher queue 410. In step ST2, if ticket voucher request generator/grant processor 412 determines that MSUs are not present, ticket voucher request generator/grant processor 412 continues checking. If ticket voucher request generator/grant processor 412 determines that MSUs are present in ticket voucher queue 410, ticket voucher request generator/grant processor 412 issues a ticket voucher (TV) request and waits for a grant. In order to issue a TV request, ticket voucher request generator/grant processor formulates a TV message and sends the TV message over the IMT bus.

Figure 7:
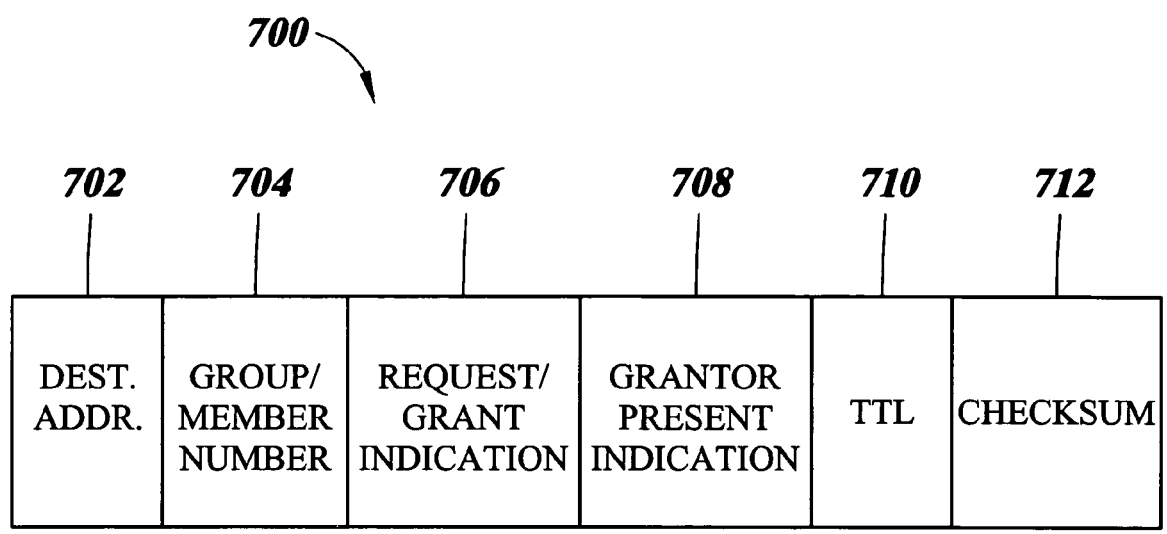
FIG. 7 is a block diagram illustrating an exemplary packet structure for a ticket voucher flow control message according to an embodiment of the present invention.

FIG. 7 illustrates an exemplary packet structure for a TV message according to an embodiment of the present invention. In the illustrated embodiment, TV message 700 includes a destination address field that specifies the destination address for the TV message. According to the present embodiment, the destination address is an IMT bus hardware address within signaling gateway 100. Because it is desirable to ensure that all of the candidate communications modules on the IMT bus receive the message, the destination address 702 is preferably that of the message originator. For example, because the IMT bus is of the ring design, the ticket voucher request message will pass through each communications module connected to the IMT bus and eventually return to the originator.

Ticket voucher request message 700 includes a group/member number field 704 for storing a group number or a member number. The group number is specified in a TV request to identify the type of cards for receiving the request. For example, one group number may indicate that the request is directed to all LIM cards. The member number is used to distinguish between linksets when changeovers occur simultaneously on more than one linkset. For example, if two different linksets are on hold simultaneously, ticket voucher requests from different cards may be issued simultaneously. Cards associated with both linksets may each issue a single grant for the associated request. Since grants are routed to all cards until they are consumed, one card could receive two grants and send MSUs at twice the desired rate and another card would receive no grants. Thus, if there is no way for the requestor to distinguish between grants, some cards could be "starved" and other cards could receive more than their share of grants.

To alleviate these problems, the member number is used to distinguish among linksets. If the grant does not contain the expected member number, the grant is ignored. Request/grant indication field 706 stores a value that indicates whether the ticket voucher flow control message 700 is a request or a grant. Grantor present indication field 708 stores a value which is used to indicate whether a grantor is present for the message. Time-to-live field 710 stores a time-to-live or hop count value that is decremented by each communications module that receives a request to prevent messages from looping endlessly within signaling gateway 100. Checksum field 712 stores a value for indicating whether ticket voucher flow control message 700 has an error.

Returning to FIG. 6, in step ST4, ticket voucher request generator/grant processor 412 determines whether a grant has been received. In step ST5, if a grant has been received, ticket voucher request generator/grant processor 412 determines whether the grant contains the expected member number. If the grant does not contain the expected member number, ticket voucher request generator/grant processor 412 ignores the grant and control returns to step ST3 where a new request is issued. If ticket voucher request generator/grant processor 412 determines that the received grant is from the card in the expected linkset, in step ST6, ticket voucher request generator/grant processor sends the MSU at the head of the ticket voucher queue to an outbound communication module, as determined by the SLC and DPC in the MSU. It is not necessary that the outbound communication module be the grantor of the request.

Returning to step ST4, if a message other than a grant is received, control proceeds to step ST7. In step ST7, ticket voucher request generator/grant processor 412 determines whether grantor present field in a received message is set to "true" but no grants are available. If the received message indicates that a grantor is present but no grants are available, ticket voucher request generator/grant processor 412 preferably issues a new request, with the expectation that grants will later become available. In this case, it may be desirable to wait for a predetermined time period before issuing a new request in order to allow sufficient time for grants to become available. In step ST7, if a ticket voucher message is received and indicates that no grantors are available, an error condition occurs and control may return to step ST1. As seen from FIG. 6, ticket voucher requests can be used to perform flow control when a link in a linkset fails.

Figure 8:
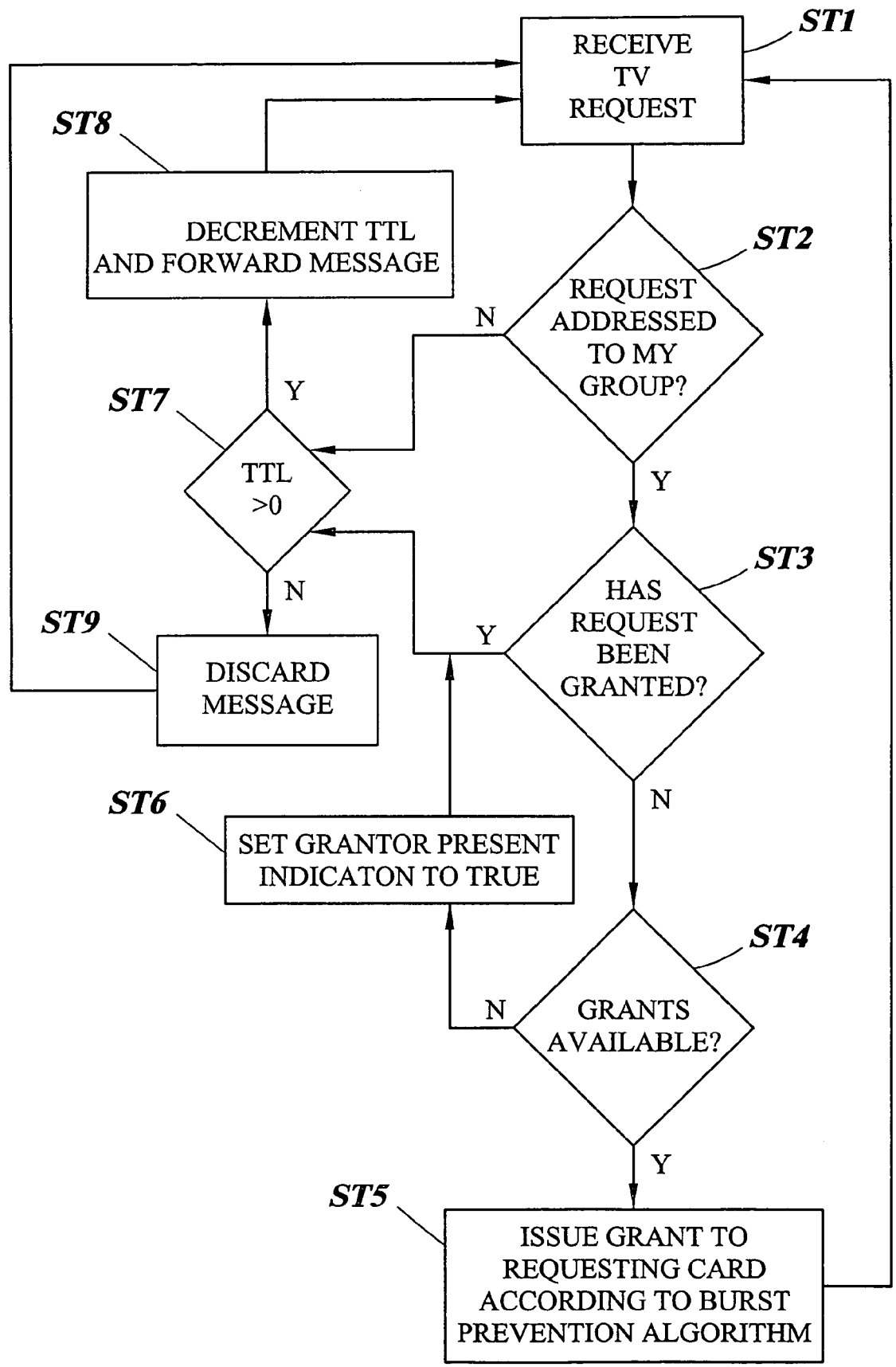
FIG. 8 is a flow chart illustrating exemplary steps that may be performed by a ticket voucher flow control process in processing a ticket voucher request according to an embodiment of the present invention.

FIG. 8 illustrates exemplary steps that may be performed by ticket voucher request processor/grant manager 414 illustrated in FIG. 4 in processing a ticket voucher request and managing ticket voucher grants. Referring to FIG. 8, in step ST1, ticket voucher request processor/grant manager 414 receives a ticket voucher request from the IMT bus. In step ST2, ticket voucher request processor/grant manager 414 determines whether the ticket voucher request is addressed to its group. This can be determined by examining the group number in field 704 of ticket voucher message 700. In step ST3, ticket voucher request processor/grant manager 414 determines whether the request has been granted. This can be determined by examining request/grant indication field 706. In step ST4, if the request has not been granted, ticket voucher request processor/grant manager 414 determines whether its communications module has any grants available. The determination as to whether any grants are available may be performed by monitoring the capacity of the outgoing signaling link associated with the interface module that received the grant.

In step ST4, if a grant is available, control proceeds to step ST5 where ticket voucher request processor/grant manager 414 issues a grant to the requesting card according to a predetermined burst prevention function. For example, the card issuing the grant may have an outbound signaling link capacity to send 1000 MSUs per second. If 1000 MSUs were enqueued in the TV queue, the associated card would issue 1000 back-to-back requests, and without any burst management function, the card with available outbound processing capacity would issue 1000 back-to-back grants. The 1000 grants would produce a burst of MSUs to be sent over the outbound signaling link in the first part of the available second and no MSUs during the remainder of the second. Bursty traffic is more susceptible to loss and hence is undesirable. Accordingly, the present invention applies a burst management algorithm when issuing ticket voucher grants.

According to the grant management algorithm, the available time slot for sending MSUs is divided into predetermined intervals. For example, if the time slot is 1 second, the predetermined intervals may be 5 milliseconds. Next, a predetermined number of grants are issued during each time interval. If the available bandwidth is 1000 MSUs/sec. and the intervals are 5 ms, then the number of grants issued during each time interval may be 5. Issuing 5 grants every 5 ms results in a total of 1000 MSUs/s, which is the available bandwidth in this example. Such spacing may be accomplished using a grant timer to control the issuance of grants. For example, the timer may be set to the interval (5 ms). When the timer expires, grants are issued, and the timer is reset. No grants are issued until the timer expires. Sending 5 MSUs every 5 milliseconds for one second uses the same average bandwidth over the one second interval as sending 1000 MSUs every 100 ms. However, the latter is more bursty. The present invention solves this problem by using a grant timer to smoothly space grant issuance over an available time slot.

In order to issue a grant, request processor/grant manager 414 changes request/grant indication field 706 to a value that indicates that the message is a grant and changes the group/member number field to the member number associated with the linkset of the card that issued the grant. Control then returns to step ST1 to process the next request.

Returning to step ST4, if the card receiving the ticket voucher request determines that no grants are available, control proceeds to step ST6 where the grantor present indication in the message is set to true. In step ST7, the time-to-live value in the message is checked. If the TTL value is greater than zero, the TTL value is decremented and the message is forwarded to the next card (step ST8). If the TTL value is not greater than zero, the message is discarded (step ST9).

Returning to step ST2, if the request is not addressed to the group of the receiving card, ticket voucher request processor/grant manager 414 determines whether the time-to-live value in the message is greater than zero (step ST7). If the time-to-live value is greater than zero, ticket voucher request processor/grant manager 414 decrements the TTL value in the message and forwards the message to the next card time-to-live (step ST8). If the time-to-live value is not greater than zero, in step ST9, ticket voucher request processor/grant manager 414 discards the message. This prevents excessive looping on the IMT bus. Once the message has been either forwarded or discarded, control returns to step ST1 to process the next ticket voucher request. Accordingly, the steps in FIG. 8 illustrate exemplary steps that may be performed in processing ticket voucher requests. Such steps allow receiving cards to efficiently communicate their outgoing link processing capability to a requestor.

The ticket voucher flow control system according to embodiments of the present invention performs efficient flow control when a link in a linkset fails. By controlling the flow of MSUs based on ticket voucher request and grant messages, the present invention efficiently regulates the flow of enqueued MSUs to outbound signaling links. The present invention also includes mechanisms for distinguishing between ticket voucher grants when cards associated with two or more linksets simultaneously issue grant messages.

Although the embodiments illustrated in FIGS. 3 and 4 include ticket voucher flow control functionality located on link interface modules 300, 302, 304, and 306, the present invention is not limited to such an embodiment. For example, in an alternate embodiment of the invention, a centralized grantor module may monitor the capacity of all outbound signaling links and issue ticket voucher grants in response to the requests, as described above with regard to FIG. 8.

It will be understood that various details of the invention may be changed without departing from the scope of the invention. Furthermore, the foregoing description is for the purpose of illustration only, and not for the purposes of limitation—the invention being defined by the claims.

What is claimed is:

1. A method for controlling call signaling message flow through a signaling node when a signaling link fails, the method comprising:

within a signaling node:
(a) receiving a first call signaling message at a first communication module associated with a first signaling link;
(b) determining a second signaling link to which the first call signaling message should be routed for outbound transmission based on address information in the first call signaling message;
(c) determining whether a linkset associated with the second signaling link is on-hold, and, in response to determining that the linkset is on-hold, storing the first call signaling message in a memory buffer associated with the first communication module;
(d) determining when a linkset becomes off-hold, and, in response, transmitting a ticket voucher request message from the first communication module to a plurality of second communication modules;
(e) issuing ticket voucher grants at a rate based on available outbound signaling link bandwidth in response to ticket voucher requests, wherein issuing ticket voucher grants at a rate based on available outbound signaling link bandwidth in response to the ticket voucher requests includes issuing the grants at a rate based on a number of messages that the outbound signaling link has capacity to send within a time period;
(f) in response to transmitting the request message, receiving one of the ticket voucher grants indicating that one of the plurality of second communication modules is capable of transmitting the first call signaling message over an outbound signaling link; and
(g) in response to receiving the grant, routing the first call signaling message to one of the second communication modules based on address information in the call signaling message.

2. The method of claim 1 wherein transmitting a ticket voucher request message includes specifying a group number in the ticket voucher request message of communication modules capable of routing the first call signaling message to external nodes.

3. The method of claim 1 wherein transmitting a ticket voucher request message includes addressing the ticket voucher request message to the first communication module.

4. The method of claim 1 comprising starting a sequence timer in response to failure of the second signaling link, and wherein determining whether the linkset is off-hold includes determining whether the sequence timer has expired.

5. The method of claim 1 wherein determining a signaling link to which the first call signaling message should be routed includes determining the signaling link based on message transfer part (MTP) information in the first call signaling message.

6. The method of claim 5 wherein the MTP information includes the signaling link selection (SLS) code and the destination point code (DPC) in the first call signaling message.

7. A method for processing ticket voucher request messages received in response to failure of a signaling link within a signaling node, the method comprising:
(a) receiving, at a first communication module, a plurality of ticket voucher request messages transmitted from a second communication module;
(b) determining whether each ticket voucher request message is intended for the first communication module; and
(c) in response to determining that each ticket voucher request message is intended for the first communication module, issuing ticket voucher grants at a rate based on available outbound signaling link bandwidth, wherein issuing ticket voucher grants at a rate based on available outbound signaling link bandwidth includes issuing the grants at a rate based on a number of messages that an outbound signaling link associated with the first communication module has capacity to send within a time period.

8. The method of claim 7 wherein issuing the ticket voucher grants includes sending each ticket voucher grant message to the second communication module via an interprocessor message transport bus.

9. The method of claim 8 wherein sending each ticket voucher grant message includes altering a request/grant indicator field in each ticket voucher request message and forwarding each modified ticket voucher request message over the IMT bus.

10. The method of claim 7 wherein determining whether each ticket voucher request message is intended for the first communication module includes determining whether each ticket voucher request message is addressed to the group of the first communication module, and in response to determining that the ticket voucher request message is not addressed to the group of the first communication module, forwarding each ticket voucher request message over an interprocessor message transport (IMT) bus.

11. The method of claim 10 comprising in response to determining that each ticket voucher request message is addressed to the group of the first communication module, determining whether each request has been granted, and, in response to determining that each request has been granted, forwarding each ticket voucher request message over the IMT bus.

12. A method for performing flow control in a signaling node in response to signaling link failure using ticket voucher request and grant messages, the method comprising:

within a signaling node:
(a) placing a linkset on hold based on failure of one or more signaling links in the linkset;
(b) starting a sequence timer for the linkset;
(c) receiving a plurality of call signaling messages directed to one of the signaling links in the linkset;
(d) storing the call signaling messages in a queue;
(e) in response to expiration of the sequence timer, issuing a plurality of ticket voucher request messages to cards capable of sending the call signaling messages over an outbound signaling link; and (f) receiving the ticket voucher request messages from at least one of the cards capable of sending the call signaling messages over the outbound signaling link, and, in response, issuing ticket voucher grant messages at a rate based on available bandwidth of the outbound signaling link, wherein issuing ticket voucher grant messages at a rate based on available bandwidth of the outbound signaling link includes issuing the ticket voucher grant messages at a rate based on a number of messages that the outbound signaling link is capable of sending within a time period.

13. The method of claim 12 comprising:
    (a) receiving one of the ticket voucher grant messages;
    (b) determining whether the ticket voucher grant message is from a card associated with the linkset; and
    (c) in response to determining that the grant message is not from a card associated with the linkset, ignoring the ticket voucher grant message.

14. The method of claim 13 comprising, in response to determining that the ticket voucher grant message is from a card associated with the linkset, sending the call signaling message to an outbound signaling link.

15. A method for performing message flow control in a call signaling message routing node in response to signaling link failure, the method comprising:
within a signaling node:
    (a) receiving a plurality of call signaling messages addressed to an on-hold linkset;
    (b) enqueuing the call signaling messages in a ticket voucher queue;
    (c) in response to determining that the linkset is no longer on hold, issuing ticket voucher request messages for the call signaling messages in the ticket voucher queue;
    (d) monitoring outbound signaling link capacity;
    (e) issuing ticket voucher grant messages at a rate based on available outbound signaling link bandwidth, wherein issuing ticket voucher grant messages at a rate based on available outbound signaling link bandwidth includes issuing the grant messages at a rate based on a number of messages that the outbound signaling link has capacity to send within a time period; and
    (f) in response to the ticket voucher grant messages, sending the call signaling messages to outbound signaling links.

16. The method of claim 15 wherein issuing ticket voucher grant messages at a rate based on available outbound signaling link bandwidth includes dividing an available time slot for sending messages into predetermined time intervals and issuing a predetermined number of ticket voucher grants during each time interval.

17. A signaling node for using ticket vouchers to internally throttle call signaling messages enqueued in response to signaling link failure, the signaling node comprising:
    (a) a first communication module within the signaling node for determining whether messages are present in a ticket voucher queue and for issuing ticket voucher request messages in response to determining that messages are present in the ticket voucher queue; and
    (b) a plurality of second communication modules within the signaling node for receiving the ticket voucher request messages, and issuing ticket voucher grants to the first communication module at a rate based on an available outbound signaling link bandwidth, wherein, in response to receiving the ticket voucher grants, the first communication module forwards the call signaling messages to one of the second communication modules for outbound processing, and wherein each of the second communication modules is adapted to issue the ticket voucher grants at a rate based on a number of messages per time period that an outbound signaling link associated with each card is capable of transmitting messages.

18. The signaling node of claim 17 wherein the first communication module includes a ticket voucher request generator/grant processor for issuing the ticket voucher request messages and processing the ticket voucher grants.

19. The signaling node of claim 17 wherein each of the second communication modules includes a ticket voucher request processor/grant manager for receiving the ticket voucher request messages and issuing the ticket voucher grants.

20. The signaling node of claim 17 wherein the first communication module includes a ticket voucher queue for storing the call signaling messages until the ticket voucher grants are received.

21. The signaling node of claim 17 wherein the first communication modules is adapted to send the ticket voucher request messages only in response to determining that a linkset to which the enqueued messages are addressed is off-hold.

22. The signaling node of claim 17 wherein each of the second communication modules includes a grant timer for spacing issuance of the ticket voucher grants over a predetermined time interval.

23. A signaling node for using ticket voucher messages to internally throttle call signaling messages stored in response to signaling link failure, the signaling node comprising:
    (a) a first communication module within the signaling node for receiving call signaling messages addressed to an on-hold signaling link and, in response, for enqueuing the call signaling messages and issuing ticket voucher request messages for the call signaling messages;
    (b) a plurality of second communication modules within the signaling node for routing call signaling messages over outbound signaling links; and
    (c) a third communication module within the signaling node for monitoring available outbound signaling link bandwidth associated with the second communication modules and for issuing ticket voucher grant messages at a rate based on the available outbound signaling link bandwidth, wherein the first communication module forwards call signaling messages to the second communication modules in response to the ticket voucher grant messages, and wherein the third communication module is adapted to issue the ticket voucher grant messages at a rate based on a number of messages that outbound signaling links associated with the second communication modules are capable of transmitting messages within a time period.

24. The signaling node of claim 23 wherein the third communication modules is adapted to apply a burst management algorithm when issuing the ticket voucher grant messages.

25. A computer program product comprising computer-executable instructions embodied in a computer-readable medium for performing steps comprising:
within a signaling node:
    (a) receiving a plurality of call signaling messages from an inbound signaling link that are directed to an outbound signaling linkset that has been placed on hold;
    (b) buffering the call signaling messages for a predetermined time period;

(c) in response to expiration of the predetermined time period, issuing ticket voucher request messages to outbound communication modules;

(d) at the outbound communication modules, issuing ticket voucher grant messages at a rate based on available bandwidth of outbound signaling links associated with the outbound communication modules, wherein issuing ticket voucher grant messages at a rate based on available bandwidth of outbound signaling links associated with the outbound communication modules includes issuing the ticket voucher grant messages at a rate based on a number of messages per unit time that the outbound signaling links are capable of transmitting;

(e) receiving the ticket voucher grant messages from the outbound communication modules; and (f) routing the call signaling messages to the outbound communication modules in response to the grant messages.

26. The computer program product of claim 25 wherein receiving call signaling messages from an inbound signaling link includes receiving call signaling messages from a service switching point (SSP).

27. The computer program product of claim 25 wherein receiving call signaling messages from an inbound signaling link includes receiving call signaling messages from a signal transfer point (STP).

28. The computer program product of claim 25 wherein receiving call signaling messages from an inbound signaling link includes receiving call signaling messages from a service control point (SCP).

29. The computer program product of claim 25 wherein receiving call signaling messages from an inbound signaling link includes receiving call signaling messages from a media gateway controller (MGC).

30. The method of claim 1 wherein the ticket voucher request message is separate from the first call signaling message.

31. The method of claim 7 wherein the plurality of ticket voucher request messages is separate from call signaling messages transmitted from the second communication module.

32. The method of claim 12 wherein the plurality of ticket voucher request messages is separate from the plurality of call signaling messages.

33. The method of claim 15 wherein the plurality of call signaling messages is separate from the ticket voucher request messages.

34. The signaling node of claim 17 wherein the ticket voucher request messages are separate from the messages present in the ticket voucher queue.

35. The signaling node of claim 23 wherein the ticket voucher request messages are separate from the call signaling messages.

36. The computer program product of claim 25 wherein the ticket voucher request messages are separate from the call signaling messages.

* * * * *